March 29, 1927.
F. L. HOUSEL
1,622,587
APPLIANCE FOR COOKING VESSELS
Filed Aug. 30, 1926
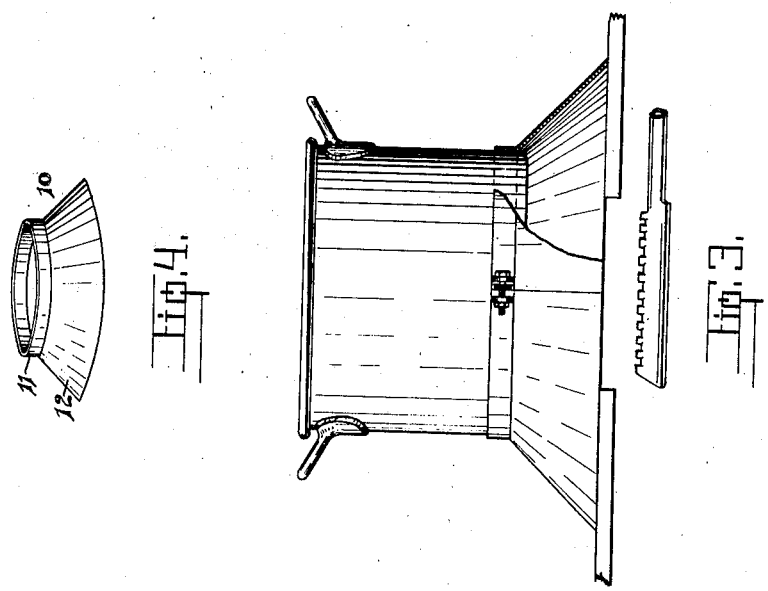
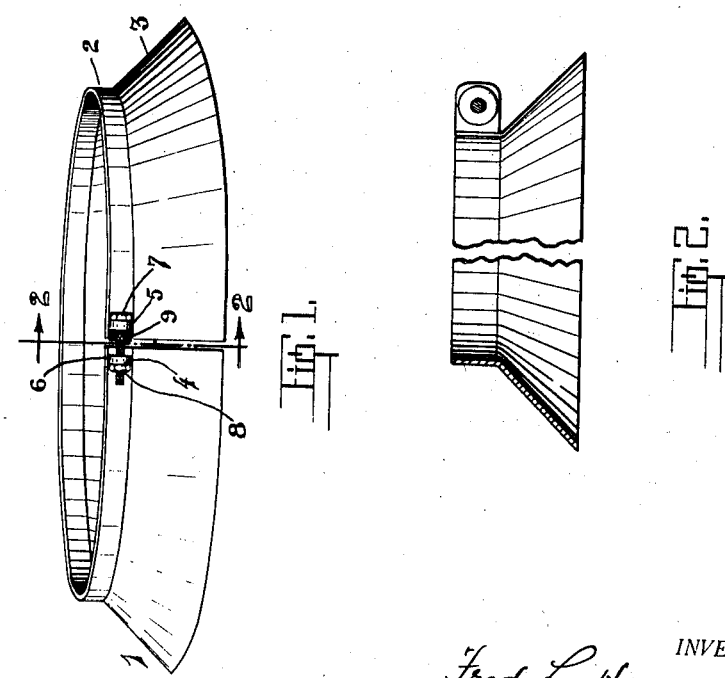
INVENTOR.
Fred L. Housel
BY
ATTORNEY.

Patented Mar. 29, 1927.

1,622,587

UNITED STATES PATENT OFFICE.

FRED L. HOUSEL, OF BROOKLYN, NEW YORK.

APPLIANCE FOR COOKING VESSELS.

Application filed August 30, 1926. Serial No. 132,579.

My invention consists in an appliance for cooking vessels, and the object of my invention is to provide an appliance which is so constructed that it will prevent the contents of a cooking vessel when boiling over from reaching the flame and extinguishing the same. To this end, the appliance, according to this invention, is constructed with an outwardly flared, or sloping portion whereby the contents of a cooking vessel, as it runs down on the outside of the vessel is deflected away from the burner.

For a better understanding of my invention, I refer to the annexed drawing, illustrating my invention, and in which Fig. 1 shows a preferred embodiment thereof; Fig. 2 is a section along line 2—2 in Fig. 1; Fig. 3 shows the appliance as used with a cookpot, Fig. 4 shows another embodiment.

As shown in Fig. 1, the appliance consists of a strip, or band 1, preferably made of sheet-metal and bent so as to form an annulus. Said band, as clearly shown, comprises a substantially straight upper portion 2 and an outwardly flared, or sloping lower portion 3. The straight upper portion 2, as Fig. 3 shows, is designed to receive the cooking vessel with a snug fit. In order to make the appliance fit cooking vessels of different sizes, the band 1 is divided so as to enable its diameter to be varied. While this may be accomplished in a number of ways, I have shown in Fig. 1 two lugs 4, 5, one being secured to each end of the divided band 1, but set back a little from the end. The lugs 4, 5 each have a hole, and through these holes may pass a screw 6 provided at one end with a head 7 and extending with its other end through a nut 8 secured to lug 4. On the screw 6 is fastened a small milled disk 9, whereby the screw 6 may be easily turned in a direction so as to draw the ends of band 1 together. As the screw has a slight play in the holes provided in the lugs 4 and 5 and as the band is made of rather thin sheet metal, its ends when drawn together by corresponding turns of the screw will be able to slip by each other, so as to overlap.

Because of the lugs 4, 5 being set back away from the ends of the band, the diameter of the band as will readily be seen, can be substantially reduced, so that the appliance can be made to fit a large number of cooking vessels.

While in Figs. 1 and 2, I have shown the preferred embodiment, Fig. 4 shows an appliance of this kind which is made in a single piece, the band 10 not being divided. In Fig. 4, 11 shows the straight upper portion and 12 the outwardly flared lower portion. If desired, such a single-piece appliance may be permanently secured to the cooking vessel by being brazed or welded thereto.

My invention being capable of further modifications, I do not, of course, wish to be limited to the embodiments as shown, but I claim:

An attachment for cooking vessels to prevent the contents of said vessels which boils over from reaching the heating means consisting of a divided annular band of sheet metal comprising a portion arranged substantially vertically adapted to engage the cooking vessel, an outwardly flared portion extending from said vertically arranged portion, lugs disposed upon the ends of said band, a screw joining said lugs and a disk upon said screw for manually adjusting the diameter of said band.

In testimony whereof I affix my signature.

FRED L. HOUSEL.